US009965889B2

(12) United States Patent
Hur et al.

(10) Patent No.: US 9,965,889 B2
(45) Date of Patent: May 8, 2018

(54) RAY TRACING CORE AND RAY TRACING CHIP HAVING THE SAME

(71) Applicants: SILICONARTS, INC., Seoul (KR); INDUSTRY-ACADEMIA COOPERATION FOUNDATION OF SEJONG UNIVERSITY, Seoul (KR)

(72) Inventors: Jin Suk Hur, Seoul (KR); Woo Chan Park, Seoul (KR)

(73) Assignees: SILICONARTS, INC., Seoul (KR); INDUSTRY-ACADEMIA COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days. days.

(21) Appl. No.: 15/078,643

(22) Filed: Mar. 23, 2016

(65) Prior Publication Data

US 2016/0203633 A1 Jul. 14, 2016

Related U.S. Application Data

(63) Continuation of application No. 13/375,112, filed as application No. PCT/KR2010/003173 on May 19, 2010, now Pat. No. 9,311,739.

(30) Foreign Application Priority Data

May 28, 2009 (KR) ........................ 10-2009-0046909

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
CPC ......... G06T 15/06; G06T 15/005; G06T 1/20; G06F 12/0855; G06F 12/0888; G06F 12/0811; G06F 9/3826
See application file for complete search history.

(56) References Cited

U.S. PATENT DOCUMENTS 7,940,266 B2 5/2011 Shearer
8,212,816 B1 7/2012 Hoberock et al.
(Continued)

FOREIGN PATENT DOCUMENTS

CN 101192310 A 6/2008
JP 2007522567 A 8/2007
(Continued)

OTHER PUBLICATIONS

Oubong Gwun et al., A Parallel Rendering Machine for High Speed Ray Tracing—Macropipeline Architecture, Nov. 21, 1990, pp. 39-47, 85-6, Kyushu Univ., Fukuoka, Japan.
(Continued)

*Primary Examiner* — Haixia Du
(74) *Attorney, Agent, or Firm* — Paratus Law Group, PLLC (57) ABSTRACT

A ray tracing core includes a ray generation unit and a plurality of T&I (Traversal & Intersection) units with MIMD (Multiple Instruction stream Multiple Data stream) architecture. The ray generation unit generates at least one eye ray based on an eye ray generation information. The eye ray generation information includes a screen coordinate value. Each of the plurality of T&I units receives the at least one eye ray and checks whether there exists a triangle intersected with the received at least one eye ray. The triangle configures a space.

18 Claims, 8 Drawing Sheets

(56) References Cited

U.S. PATENT DOCUMENTS

| | | |
|---|---|---|
| 2003/0001842 A1 | 1/2003 | Munshi |
| 2004/0223003 A1 | 11/2004 | Heirich et al. |
| 2006/0017729 A1 | 1/2006 | Chow et al. |
| 2007/0182732 A1 | 8/2007 | Woop et al. |
| 2008/0088622 A1 | 4/2008 | Shearer |
| 2008/0192050 A1 | 8/2008 | Schardt et al. |
| 2009/0138662 A1* | 5/2009 | Lauterbach ........... G06F 12/121 711/141 |
| 2009/0167763 A1 | 7/2009 | Waechter et al. |
| 2009/0219285 A1 | 9/2009 | Reshetov |
| 2009/0219286 A1* | 9/2009 | Wei ........................ G06T 15/06 345/424 |
| 2009/0284523 A1 | 11/2009 | Peterson et al. |
| 2010/0064291 A1 | 3/2010 | Aila et al. |

FOREIGN PATENT DOCUMENTS

| | | |
|---|---|---|
| KR | 10-2004-0011920 A | 2/2004 |
| KR | 10-2008-0020198 A | 3/2008 |
| WO | WO 2008/037599 A1 | 4/2008 |
| WO | WO 2009/044282 A2 | 4/2009 |

OTHER PUBLICATIONS

Tsuyoshi Abe et al., A Survey of Parallel 3D rendering Algorithms, May 20, 1994, pp. 9-17, vol. 94, No. 41, Information Processing Society of Japan.

Nieh et al., Volume Rendering on Scalable Shared-Memory MIMD Architectures, 1992 Workshop on Volume Visualization, 1992.

* cited by examiner

E: EYE RAY,
F: REFRACTION RAY,
R: REFLECTION RAY,
S: SHADOW RAY

(a) 16X16 PIXEL BLOCK (b) BLOCK-BASED RENDERING (c) HARDWARE IMPLEMENTATION

RAY TRACING CORE AND RAY TRACING CHIP HAVING THE SAME

CROSS-REFERENCE TO RELATED APPLICATIONS

This application is a Continuation of U.S. patent application Ser. No. 13/375,112 filed on Nov. 29, 2011, which is a National Stage Application under 35 U.S.C. § 371 of PCT International Patent Application No. PCT/KR2010/003173 filed on May 19, 2010, which claims priority to Korean Application No. KR 10-2009-0046909 filed on May 28, 2009, which are all hereby incorporation by reference in their entirety.

BACKGROUND

The described technology relates to 3D graphic processing, and more particularly to a ray tracing core and ray tracing chip having the same.

A 3D graphic technology uses 3D geometric data representation in a computing system and is adopted in various industries such as media and game industries. Generally, the 3D graphic technology requires a separate high performance processor due to a large amount of computations.

Particularly, according to a recent development of processor, a ray tracing technology has developed very realistic 3D graphic techniques and can simulate light effects such as reflection, refraction and shading.

SUMMARY

In some embodiments, a ray tracing core comprises a ray generation unit and a plurality of T&I (Traversal & Intersection) units with MIMD (Multiple Instruction stream Multiple Data stream) architecture. The ray generation unit generates at least one eye ray based on eye ray generation information. The eye ray generation information includes a screen coordinate value. Each of the plurality of T&I units receives the at least one eye ray and checks whether there exists a triangle intersected with the received at least one eye ray. The triangle configures a space.

In some embodiments, a ray tracing core comprises a setup processing unit, a ray generation unit and a plurality of T&I (Traversal & Intersection) units with MIMD (Multiple Instruction stream Multiple Data stream) architecture. The setup processing unit multiplexes one of eye ray generation information or shading information. The shading information includes a coordinate value, a color value and shading ray type for a ray-triangle hit point. The ray generation unit generates at least one eye ray or shading ray based on the eye ray generation information or the shading information or determines a final color value. Each of the plurality of T&I determines a triangle intersected with the generated at least one eye ray or shading ray. The triangle configures a space.

In some embodiments, a ray tracing chip comprises a plurality of ray tracing cores, an XY generator configured to allocate at least one block of image to a ray tracing core of the plurality of ray tracing cores and a memory configured to store a final color value outputted from each of the plurality of ray tracing cores. Each of the plurality of ray tracing cores comprises a ray generation unit configured to generate at least one eye ray based on an eye ray generation information, the eye ray generation information including a screen coordinate value and a plurality of T&I (Traversal & Intersection) units with MIMD (Multiple Instruction stream Multiple Data stream) architecture. Each of the plurality of T&I units receives the at least one eye ray and checks whether there exists a triangle intersected with the received at least one eye ray. The triangle configures a space.

In some embodiments, a ray tracing chip includes a plurality of ray tracing cores, an XY generator configured to allocate at least one block of image to an adequate ray tracing core of the plurality of ray tracing cores and a memory configured to store a final color value outputted from each of the plurality of ray tracing cores. Each of the plurality of ray tracing cores includes a setup processing unit configured to multiplex one of eye ray generation information or shading information, the shading information including a coordinate value, a color value and shading ray type for a ray-triangle hit point, a ray generation unit configured to generate at least one eye ray or shading ray based on the eye ray generation information or the shading information or configured to determine a final color value and a plurality of T&I (Traversal & Intersection) units with MIMD (Multiple Instruction stream Multiple Data stream) architecture, each determining a triangle intersected with the generated at least one eye ray or shading ray, the triangle configuring a space.

DETAILED DESCRIPTION

Embodiments of the described technology now will be described more fully with reference to the accompanying drawings, in which embodiments of this technology are shown. This technology may, however, be embodied in many different forms and should not be construed as limited to the embodiments set forth herein. Rather, these embodiments are provided so that this disclosure will be thorough and complete, and will fully convey the scope of this technology to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, this technology will be described in detail with reference to the accompanying drawings.

Figure 1:
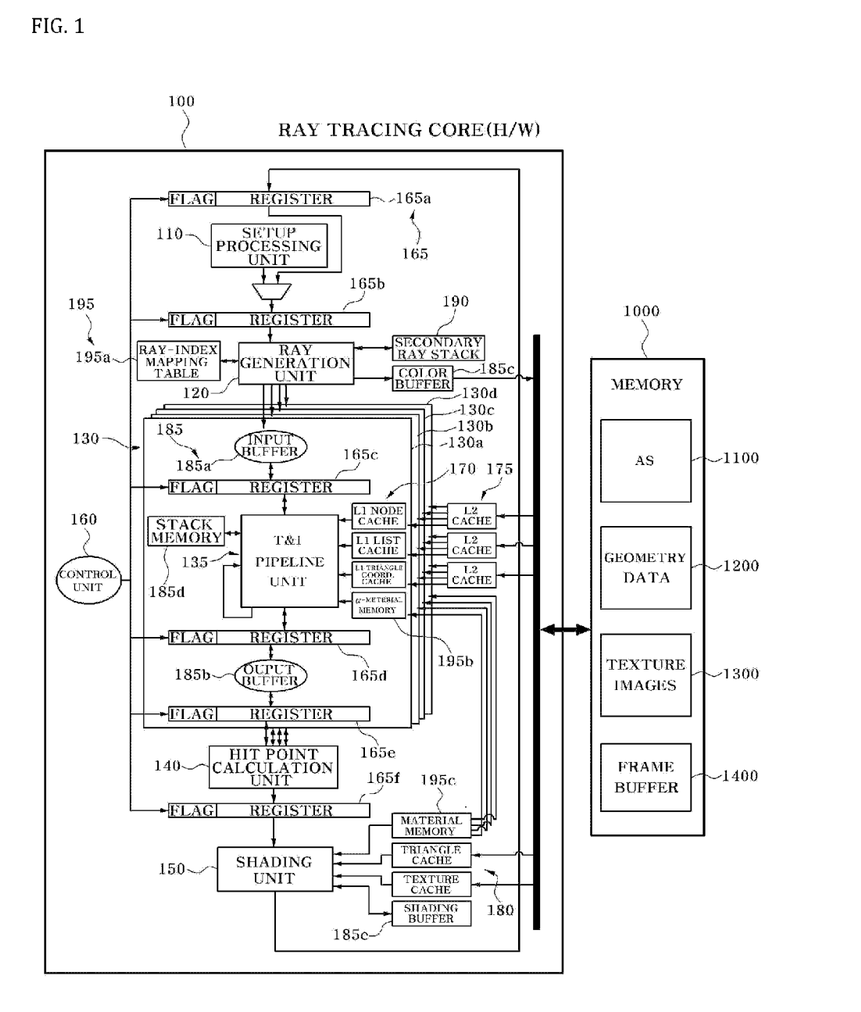
FIG. 1 is a block diagram illustrating a ray tracing core according to an example embodiment of this technology.

FIG. 1 is a block diagram illustrating a ray tracing core according to an example embodiment of this technology.

Referring to FIG. 1, a ray tracing core 100 may be mainly categorized into datapath part and memory system part. In one embodiment, the ray tracing core 100 may be included in a chip such as a graphic processor. In other embodiment, the ray tracing core 100 may be implemented in a single chip.

The datapath part includes a setup processing unit 110, a ray generation unit 120, a plurality of T&I (Traversal & Intersection) unit 130, a hit point calculation unit 140, a shading unit 150 and a control unit 160. The memory system part includes a register 165, an L1 cache 170, an L2 cache 175, a cache 180, a buffer 185, a stack 190 and a memory 195. For convenience's sake, FIG. 1 describes each of elements in the memory system part of FIG. 1 is separately implemented, but if necessary, at least of the elements may be implemented in the physically same memory.

Also, the ray tracing chip 100 may be coupled to an external memory 1000 and the external memory 1000 includes an AS (Acceleration Structure) storage unit 1100, a GD (Geometry Data) storage unit 1200, a texture image storage unit 1300 and a frame storage unit 1400.

The AS includes a kd-tree (k-depth tree) or a BVH (Bounding Volume Hierarchy) generally used in a ray tracing. The GD includes information about a triangle (hereinafter, referred to as triangle information) for ray tracing. In one embodiment, the triangle information may include a texture coordinate about three point of the triangle and a normal vector.

Figure 9:
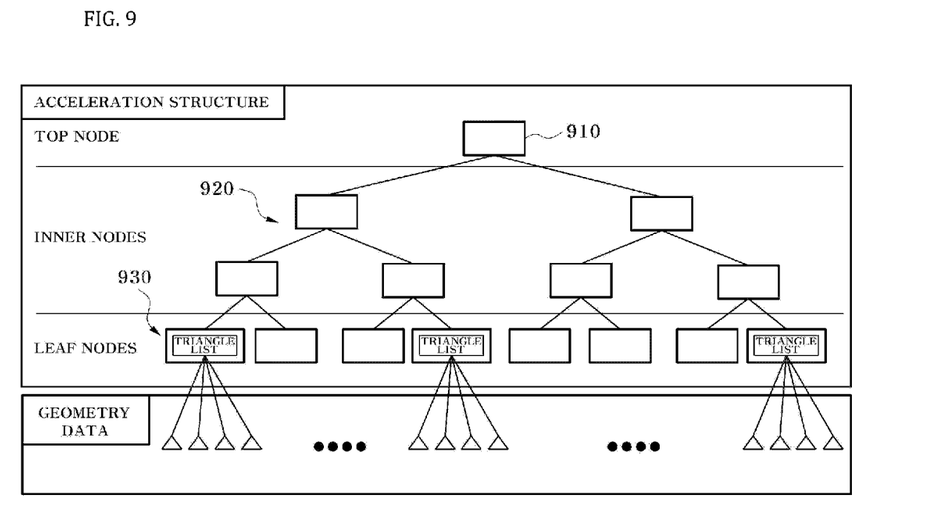
FIG. 9 is a diagram illustrating relationship between an acceleration structure and a geometry data in the ray tracing chip in FIG. 1.

FIG. 9 is a diagram illustrating relationship between an acceleration structure and a geometry data in the ray tracing chip in FIG. 1.

In FIG. 9, the AS (acceleration structure) is assumed to use a kd-tree. The kd-tree is a kind of a spatial partitioning tree and is used for a ray-triangle intersection test. The kd-tree includes a box node 910, an inner node 920 and a leaf node 930. The leaf node 930 includes a triangle list for pointing at least one triangle information included in the geometry data. In one embodiment, when the triangle information included in the geometry data, the triangle list included in the leaf node 930 corresponds to an array index.

Figure 2:
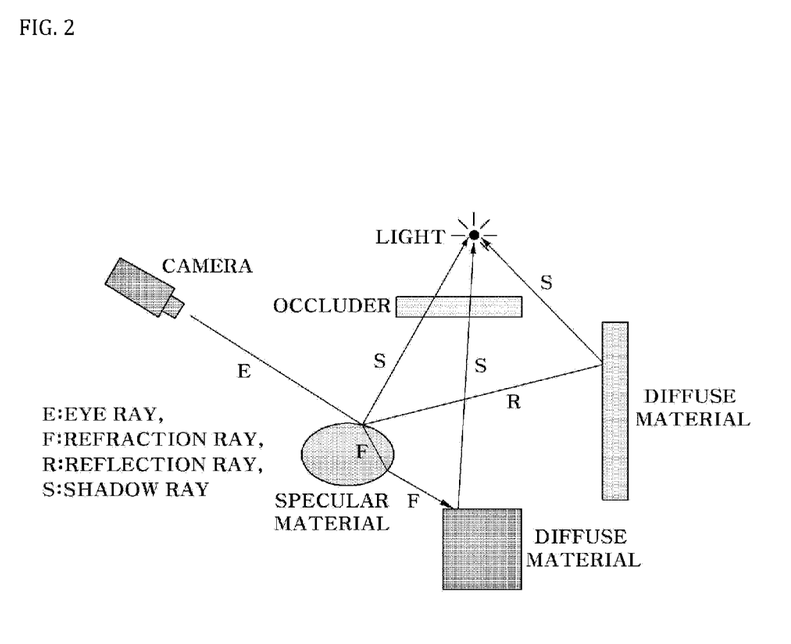
FIG. 2 and FIG. 3 are diagrams illustrating a ray tracing procedure.
Figure 3:
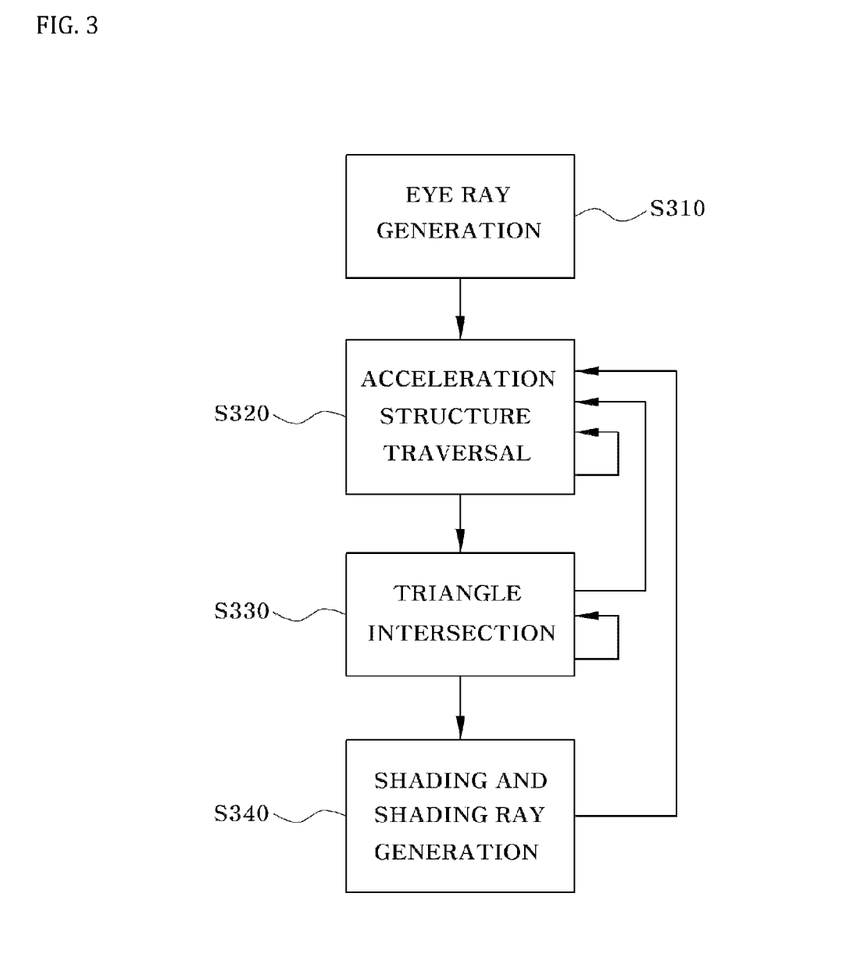

FIG. 2 and FIG. 3 are diagrams illustrating a ray tracing procedure.

Hereinafter, an entire operation of the ray tracing core 100 will be described with references with FIGS. 1 through 3.

The setup processing unit 110 prepares for eye ray generation information and selects the prepared eye ray generation information or shading information outputted from the shading unit 150. The eye ray generation information includes a screen coordinate value for an eye ray generation. The shading information for ray-triangle hit point includes a ray index for obtaining the screen coordinate value, a coordinate value of the ray-triangle hit point, a color value of the ray-triangle hit point and shading ray type. If necessary, the shading information may further include additional information according to shading ray type. The shading ray includes a shadow ray, a secondary ray or a null ray. The secondary ray includes a refraction ray or reflection ray. In the refraction ray, the addition information includes a refraction ratio for the ray-triangle hit point and in the reflection ray, the addition information includes a reflection ratio for the ray-triangle hit point. An operation of the setup processing unit 110 will be described with reference to FIG. 4.

The ray generation unit 120 may generate at least one eye ray based on the eye ray generation information or the shading information (Step S310 or S340). As illustrated in FIG. 2, the at least one eye ray may include an eye ray E, a shadow ray S, a refraction ray F and/or a reflection ray R. When the number of the secondary ray is equal to or greater than 2, one is outputted to T&I unit 130 and the other or others are pushed into the secondary ray stack 190. In the secondary ray, the ray generation unit 120 may consider a hit point of the reflection ray R or a hit point of the refraction ray F. For example, when all of the refraction ray F and the reflection ray R are generated, the reflection ray R may be outputted to the T&I unit 130 and the refraction ray F may be pushed in the secondary ray stack 190.

When the shading type corresponds to the null ray, the ray generation unit 120 pops the secondary ray pushed into the secondary ray stack 190 and outputs the popped secondary ray to the T&I unit 130. When the secondary ray stack 190 is empty, the ray generation unit 120 obtains a screen coordinate value based on a ray index and writes, into a color buffer 185c, a final color value based on a color value of the screen coordinate value and ray-triangle hit point.

The plurality of T&I units 130 adopts MIMD (Multiple Instruction stream Multiple Data stream) architecture. Each of the plurality of T&I units 130 receives a ray such as an eye ray, a shadow ray or a secondary ray from the ray generation unit 120 and checks whether there exists a triangle intersected with the ray in the AS. That is, each of the plurality of T&I units 130 traverses the AS and performs an intersection testing about triangles. An operation of the plurality of T&I units 130 will be described with reference to FIG. 5 through FIG. 10.

The hit point calculation unit 140 calculates a coordinate value of a ray-triangle hit point for the intersected triangle. The ray-triangle hit point indicates a point, hit by the ray, in the intersected with the triangle. The shading unit 150 calculates a color value for the ray-triangle hit point. In one embodiment, the shading unit 150 may perform a phong illumination and a texture mapping for obtaining the color value for the ray-triangle hit point (Step S340). Also, the shading unit 150 determines the final color value by the ray generation unit 120 or generates the shading information for shading ray generation, and transmits the shading information to the setup processing unit 110. When there needs no more ray generation, the shading ray type may correspond to the null ray. In one embodiment, the shading unit 150 may determine secondary ray generation based on material information, stored in the material memory 195c, about the ray-triangle hit point. Hereinafter, each of the elements of the datapath will be described.

<Pipeline Control Architecture>

A ray tracing algorithm is recursively performed and includes (i) an eye ray generation procedure (Step S310) (ii) an AS traversal procedure (Step S320) (iii) a ray-triangle intersection test (Step S330) (iv) a shading and shading ray generation procedure (Step S340). Therefore, the ray tracing algorithm may not be adequate in using a general streaming pipeline architecture.

This technology introduces the pipeline architecture for the ray tracing algorithm and the control unit 160 control a pipeline operation through a flag in a pipeline (e.g., register) 165. That is, this technology adopts a simple flag-based control mechanism for raising pipeline efficiency. In one embodiment, the flag in the pipeline 165 may correspond to 1-bit information for representing on or off. When the flag is turned on, the pipeline 165 may store information of a previous stage. As a result, by using the flag, the pipeline 165 may synchronously perform its procedure and each of the elements in the datapath may asynchronously output their results. If necessary, each of the elements in the datapath may use a buffer 185 for decreasing a waiting time due to load imbalance. For example, each of the plurality of T&I units 130 may use the buffer 185 for performance improvement and MIMD architecture support.

<Setup Processing Unit 110>

The setup processing unit 110 initializes eye ray generation information. In the initialization procedure, the setup processing unit 110 determines the screen coordinate value and translates the determined screen coordinate value into a ray index. The ray index is used for reducing a pipeline (e.g., register 165) size in each of the pipeline stage. The setup processing unit 110 transmits the screen coordinate value and the ray index to the ray generation unit 120.

The setup processing unit 110 multiplexes the eye ray generation information or the shading information. In one embodiment, the shading information may have a priority for the eye ray generation information. It may be preferable to be performed in advance for a ray generated in a pixel of a previous screen coordinate value.

Figure 4:
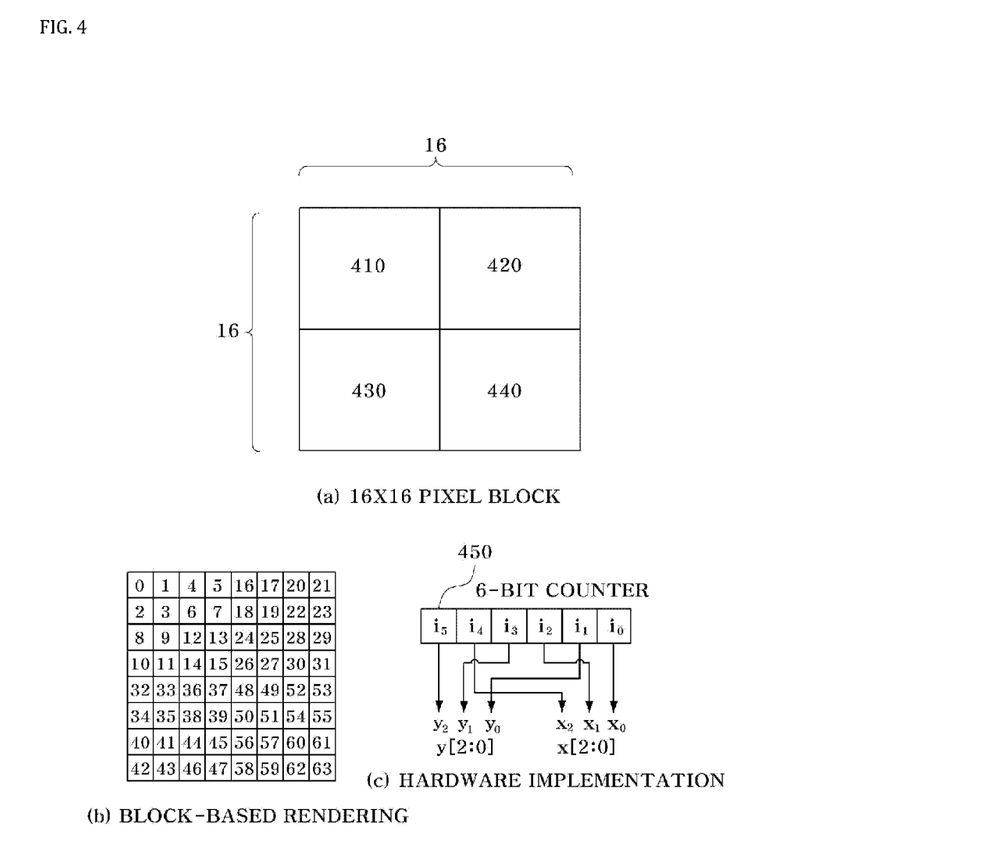
FIG. 4 is a diagram for illustrating a block-based ray generation order by a setup processing unit in FIG. 1 and its hardware.

FIG. 4 is a diagram for illustrating a block-based ray generation order by a setup processing unit in FIG. 1 and its hardware.

A screen includes a plurality of m×n pixel blocks (hereinafter, referred to as a super-block). The m and n are even numbers. Each super-block includes N pixel blocks (hereinafter, referred to as a sub-block). The N corresponds to the number of the plurality of T&I units 130. Each of the N pixel blocks has the same size.

The setup processing unit 110 divides the screen into a plurality of blocks (i.e., sub-blocks) for increasing a cache hit ratio and may determine a block-based eye ray generation order. For example, the screen may include a plurality of super-blocks and each of the plurality of super-blocks is configured of 16×16 pixel block. Each of the super-blocks may include a plurality of sub-blocks and each of the plurality of sub-blocks may include 4 8×8 pixel blocks. Each of the first through fourth pixel blocks 410 through 440 may be allocated into the first through fourth T&I units 130a through 130d.

Hereinafter, the first sub-block 410 is assumed to correspond to 8×8 pixel block in FIG. 4(b) and assumed to be allocated into the first T&I unit 130a.

The setup processing unit 110 may use a linear n-bit counter 450 to determine the eye ray generation order for increasing a cache hit ratio. A first group of the linear n-bit counter 450 represents x coordinate value of the sub-block. The first group may at least one non-continuous bit. A second group of the linear n-bit counter 450 represents y coordinate value of the sub-block. The second group may at least other non-continuous bit. That is, the first and second groups are mutually exclusive.

The ray generation unit 120 generates a ray based on the eye ray generation order determined by the setup processing unit 110, as illustrated in FIGS. 4(b) and (c). A pixel (e.g., pixel 0) in FIG. 4(b) represents a pixel for a ray generation. For example, in 64 pixels, the setup processing unit 110 may include a linear 6-bit counter 450. When I=i5i4i3i2i1i0 (I represents a value of the linear 6-bit counter 450), a coordinate (x, y) of the pixel corresponds to (i5i3i1, i4i2i0). That is, the linear 6-bit counter 450 may be implemented for easier mapping when the number of counter increases.

<Ray Generation Unit 120>

The ray generation unit 120 stores, into a ray index mapping table 195a, the screen coordinate value and the ray index by the setup processing unit 110 and generates at least one ray based on the eye ray generation information or the shading information, or stores the final color value into the color buffer 185a.

When the eye ray generation information is received, the ray generation unit 120 generates an eye ray E. When the shading information is received, the ray generation unit 120 generates the shading ray S, R or F according to the shading ray type and when the shading ray type corresponds to the null ray, the ray generation unit 120 pops a secondary ray pushed into the secondary ray stack 190. When the secondary ray stack 190 is empty, the ray generation unit 120 obtains the screen coordinate value based on the ray index and stores, into the color buffer 185c, the obtained screen coordinate value and the ray-triangle hit point. Hereinafter, a ray generation procedure by the ray generation unit 120 will be described.

In the eye ray generation, the ray generation unit 120 uses a ray index mapping table 195a to find out a screen coordinate value of the eye ray E and to generate the eye ray E based on the screen coordinate value. Generally, the eye ray E may be generated based on the screen coordinate value and a location of a camera (i.e., location of an eye). The ray generation unit 120 allocates the generated eye ray into adequate T&I unit (e.g., 130a) of the plurality of T&I units 130.

In a shadow ray generation, when the shading ray type corresponds to a shadow ray, the ray generation unit 120 generates the shadow ray based on the ray-triangle hit point. Generally, the shadow ray may be generated based on the screen coordinate value and a light position. In one embodiment, for reducing an amount of computations, the ray generation unit 120 limits the number of light source.

In a secondary ray generation, when the shading ray type corresponds to a secondary ray, the ray generation unit 120 generates at least one secondary ray (i.e., refraction ray and/or reflection ray). When the number of the at least one secondary ray is equal to or greater than 2, the ray generation unit 120 stores, into the secondary ray stack 190, the at least one secondary ray except one. The ray generation unit 120 allocates the unstored secondary ray into an adequate T&I unit (e.g., 130*b*) of the plurality of T&I units 130. The secondary ray stored in the secondary ray stack 190 may include the screen coordinate value, a direction vector value and an RGB weight. In one embodiment, for reducing an amount of computations, the ray generation unit 120 uses a ray depth to prevent unlimited secondary ray generation by the secondary ray.

In a null ray generation, when the shading ray type corresponds to a null ray, the ray generation unit 120 pops the secondary ray pushed into the secondary ray stack 190 and then allocates the popped secondary ray into an adequate T&I unit (e.g., 130*c*) of the plurality of T&I units 130. When the secondary ray stack 190 is empty, the ray generation unit 120 obtains the screen coordinate value based on the ray index and stores, into the color buffer 185*c*, the final color value based on a color value of the ray-triangle hit point. The final color value stored in the color buffer 185*c* is stored in the external memory 1000.

<T&I Unit 130>

The plurality of T&I units 130 performs an AS traversal procedure (Step S320) and a ray-triangle intersection test procedure (Step S330).

Figure 5:
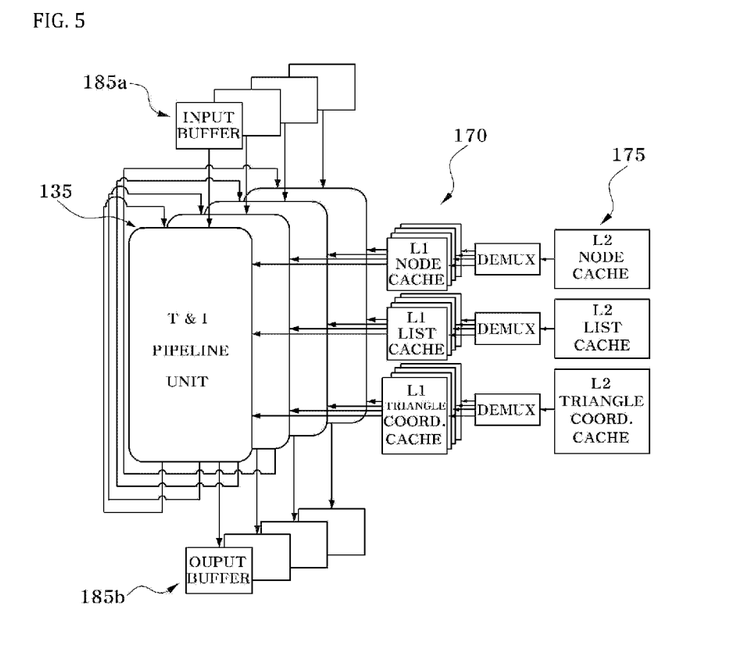
FIG. 5 is a block diagram illustrating a plurality of T&I units 130 in FIG. 1.

FIG. 5 is a block diagram illustrating a plurality of T&I units 130 in FIG. 1.

Referring to FIG. 5, each of the plurality of the T&I units 130 includes a buffer 185, an L1 cache 170 and a T&I pipeline unit 135.

The plurality of the T&I units 130 adopts MIMD architecture independently performed by the T&I pipeline unit 135. The ray tracing algorithm may process each ray with MIMD architecture. The MIMD architecture has an advantage over SIMD (Single Instruction stream Multiple Data stream) architecture in using a pipeline effectively.

Each of the plurality of the T&I units 130 includes its own input buffer 185*a* and an output buffer 185*b*. It may be preferable that rays (e.g., eye ray and shading ray) generated from the same pixel may be processed in the same T&I units 130. Also, each of the plurality of the T&I units 130 includes its own L1 cache 170. This is because the MIMD architecture may require an efficient cache memory.

The T&I pipeline unit 135 performs (i) a traversal procedure (ii) a triangle list fetch procedure (iii) a ray-triangle intersection test procedure. The AS is assumed to correspond to a kd-tree.

In the traversal procedure, the T&I pipeline unit 135 searches a leaf node intersected with ray by searching the AS for nodes. The traversal algorithm of the AS is well known to a person of ordinary skill in the relevant field, the explanation about the traversal algorithm omits. In the triangle list fetch procedure, the T&I pipeline unit 135 reads a triangle list included in the intersected leaf node. In the ray-triangle intersection test procedure, the T&I pipeline unit 135 reads coordinate information of the triangle list and performs the intersection test for a given ray.

Figure 6:
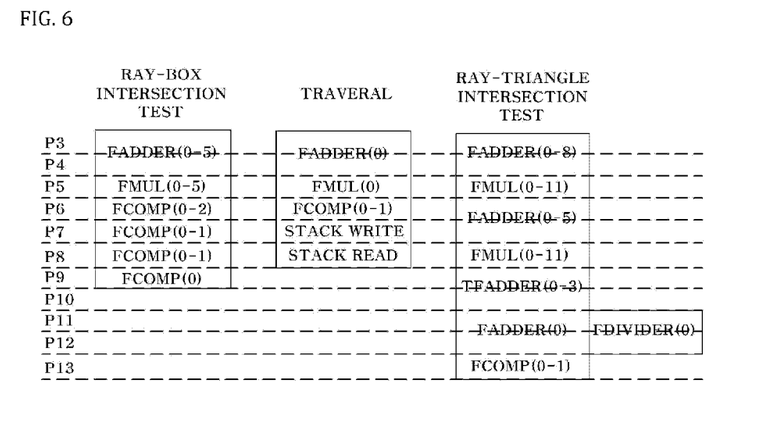
FIG. 6 and FIG. 7 are diagrams illustrating a T&I pipeline unit in FIG. 5.
Figure 7:
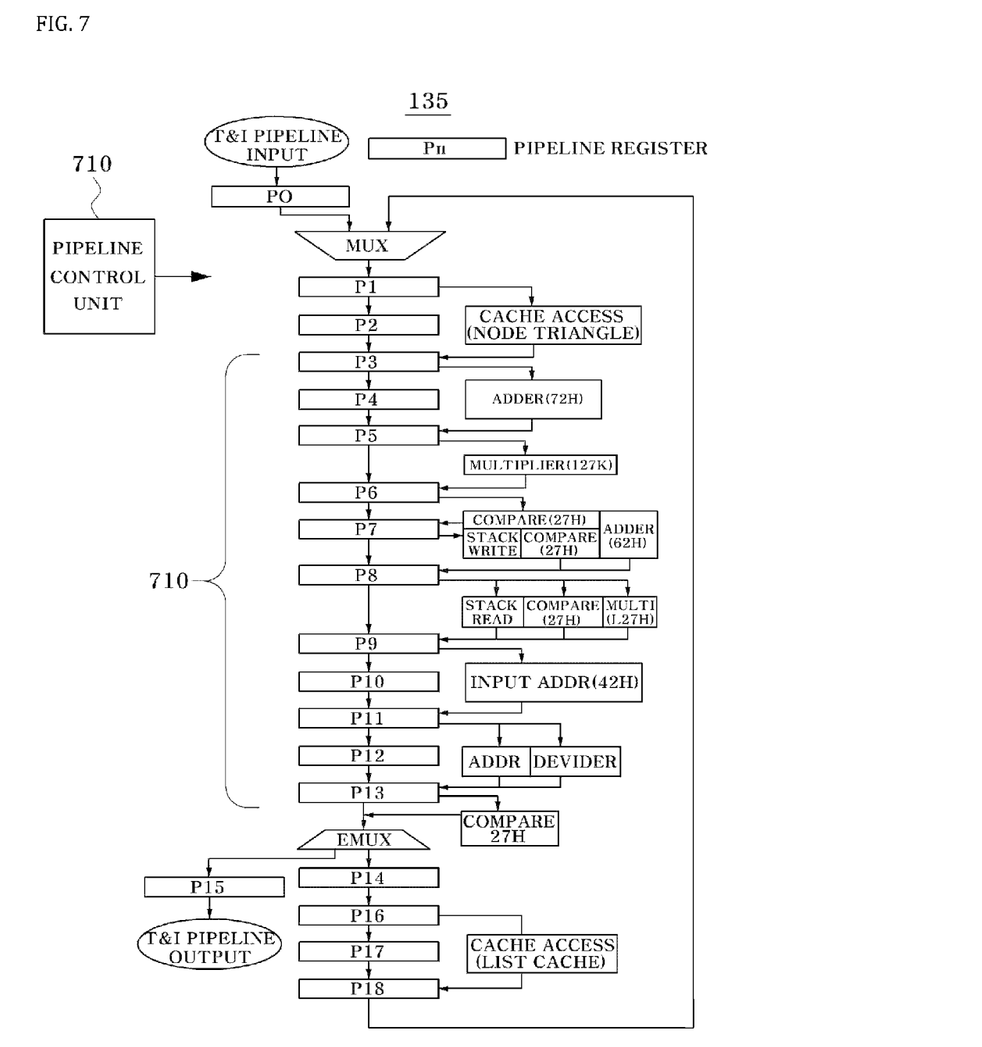

FIG. 6 and FIG. 7 are diagrams illustrating a T&I pipeline unit in FIG. 5.

A ray tracing architecture in [SCHMITTLER, J., WALD, I., AND SLUSALL P. 2002. Saarcor: a hardware architecture for ray tracing. In Proceedings of the IGGRAPH/EUROGRAPHICS conference on Graphics Hardware] (hereinafter, referred to as reference 1) and [SCHMITTLER, J., WOOP, S., WAGNER, D., PAUL, W. J., AND SLUSALLEK, P., 2004. Realtime ray tracing of dynamic scenes on an FPGA chip. In Proceedings of the SIGGRAPH/EUROGRAPHICS conference on Graphics Hardware] (hereinafter, referred to as reference 2) uses a separate hardware for a traversal and intersection test. However, the T&I pipeline unit 135 in FIG. 5 adopts a unified pipeline architecture for effectively supporting the AS without load imbalance between traversal and intersection test. That is, the T&I pipeline unit 135 in FIG. 7 may use the same hardware in each stage of the traversal and intersection test. Hereinafter, the difference between the described technology and the references 1 and 2 will be described.

In FIG. 6 and FIG. 7, the AS is assumed to correspond to the kd-tree. FIG. 6 explains the traversal procedure performed in the T&I pipeline unit 135, operators used in the ray-triangle intersection test and the number of the operators. The traversal procedure may mainly include a ray-box intersection test and the traversal. In FIG. 9, a top node 910 of the kd-tree corresponds to the box node. The pipeline control unit 710 controls pipelines in the T&I pipeline unit 135. An operation in the ray-box intersection test, traversal and ray-triangle intersection test is well described in [MOLLER, T., AND TRUMBORE, B. 1997 Fast, minimum storage ray-triangle intersection, Journal of Graphics Tools].

In FIG. 6, the operators sequentially used in the ray-box intersection test include 6 FADD (floating point adder), 6 FMUL (floating point multiplier), a first 3 FCOMP (floating point comparator), a second 2 FCOMP and a third 1 COMP.

In FIG. 6, the operators sequentially used in the traversal include 1 FADD, 1 FMUL and 2 FCOMP. Also, the operation sequentially used in the traversal includes stack pushing into a stack memory 185*d* and popping from the stack memory 185*d*.

In FIG. 6, the operators sequentially used in the ray-triangle intersection test include a first 9 FADD, a first 12 FMUL, a second 6 FADD, a second 12 FMUL, 4 TFADD (triple input FADD), 1 FADD and FDIV (float point divider) and 2 FCOMP.

The ray-triangle intersection test calculates a distance between the nearest triangle intersected by a given ray and an intersection point of an eye location (or camera location). If there exists the intersected triangle, information about the intersected triangle is transmitted to the hit point calculation unit 140. Otherwise, a next traversal is performed. In one embodiment, the ray-triangle intersection test may use an algorithm in [MOLLER, T., AND TRUMBORE, B. 1997. Fast, minimum storage ray-triangle intersection. Journal of Graphics Tools].

FIG. 7 is a diagram illustrating a configuration of a T&I pipeline unit for performing a triangle list fetch procedure and ray-triangle intersection test procedure.

The T&I pipeline unit 135 uses a unified single pipeline to perform the traversal procedure, the triangle list fetch procedure and the ray-triangle intersection test procedure. That is, the pipeline stage in 710 performs the traversal procedure and the ray-triangle intersection test procedure and other stage performs a cache access or triangle list fetch procedure. As illustrated in FIG. 7, the described technology does not use a separate hardware and adopts the unified pipeline architecture.

<Memory System of T&I Unit 130>

Figure 8:
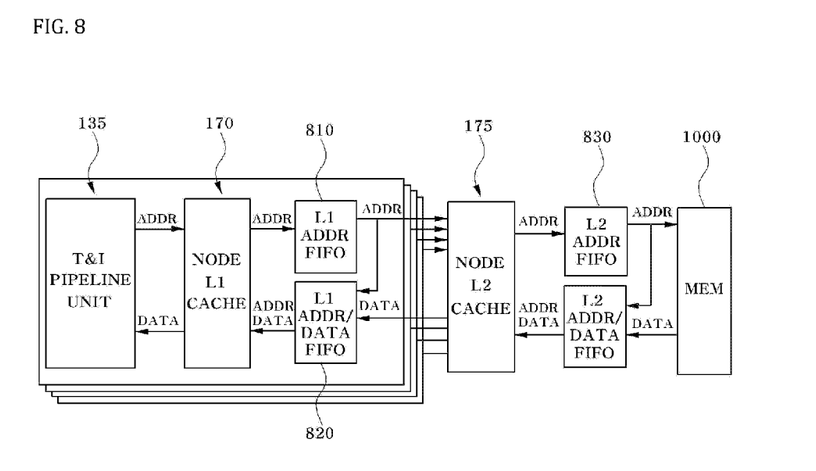
FIG. 8 is a diagram illustrating a memory system of a T&I unit in FIG. 1.

FIG. 8 is a diagram illustrating a memory system of a T&I unit in FIG. 1.

Because the T&I unit 130 requires a large amount of memory access, the memory system of the T&I unit 130 may be necessary to be effectively designed. As illustrated in FIG. 1 and FIG. 5, each of the plurality of T&I units 130 includes 3 L1 caches and uses a common L2 cache. In spite of two-level hierarchy of a cache memory, a pipeline stall time due a cache miss is still high. Therefore, the described technology uses the following two techniques for solving the above problem.

A first technique relates to an L1 cache miss and when the L1 cache miss occurs, the L1 cache miss bypasses without stall so that the L1 cache miss is solved in a next cycle. In FIG. 5, when a cache miss in a pipeline P1 occurs, the pipeline control unit 710 continues without stall into a subsequent stage pipeline P2. During miss handling process, a cache controller (not shown) accesses either L2 cache 185 or external memory 1000 to fetch data. When the pipeline P1 is processed again after a pipeline P18, an access into the L1 cache occurs. If the cache miss is solved, the pipeline control unit 710 normally processes a subsequent pipeline P2 and if the cache miss occurs again, the pipeline control unit 710 repeats the above procedure until the cache miss is solved. As a result, a cache miss penalty due to the cache miss may be considerably mitigated.

A second technique relates to an L2 cache miss and when the L2 cache occurs, the L2 cache miss bypasses without stall. If the L1 cache miss occurs in a current ray, a requirement for an L2 cache access is inputted to L1 Addr FIFO 810. If the L2 cache access is hit, an address and data is inputted to an L1 Addr/Data FIFO 820. Otherwise, other requirement for the external memory 1000 is inputted to an L2 Addr FIFO 810 and the requirement in the current ray is deleted. The cache access for the deleted requirement occurs in a next loop. If the cache access occurred in the next loop, the above procedure is repeated. Therefore, even though the cache miss in an L2 cache access by a requirement for a next ray occurs, the L2 cache access by the requirement for the next ray is allowed. As a result, a cache miss penalty due to the cache miss may be considerably mitigated.

FIG. 8 takes an example of a Node L1 Cache 170 but an L1 List Cache and L1 Triangle Coordinate Cache may similarly operate.

<Hit Point Calculation Unit 140 and Shading Unit 150>

The hit point calculation unit 140 uses a distance with a triangle and a vector value for a given ray to calculate a coordinate value of the ray-triangle hit point. The triangle is outputted from the T&I unit 130 and hit by a ray. Because the one ray-triangle hit point occurs in one ray, the hit point calculation unit 140 may be implemented in the T&I unit 130.

The shading unit 150 uses information stored in a material memory 195c and triangle information cache 180 to calculate a color value of the ray-triangle hit point. The material memory 195c stores material information about a triangle in the geometry data storage unit 1200. In one embodiment, the material information may include a texture index, a ambient constant, a diffuse constant, a specular constant, a refraction rate (i.e., alpha value), a refraction angle and so on. The triangle information cache 180 is a cache for the geometry data storage unit 1200 and stores triangle information about a corresponding triangle required in the shading stage. The triangle information may further include a material index for reference to the material memory 195c.

The shading unit 150 calculates the color value of the ray-triangle hit point through a phong illumination and texture mapping, adds the calculated color value into a previous color in the shading buffer 185e, and the added color value into the shading buffer 185e. The shading buffer 185e stores the added color value by the eye ray, the shadow ray or the secondary ray generated from a given pixel and shading information.

The shading information is used for determining whether a secondary ray for a current ray is generated or not. The shading unit 150 fetches material information (i.e., reflection rate and refraction rate) from a material memory based on a material index included in triangle information about the hit triangle. If the reflection rate does not correspond to 0, the ray generation unit 120 may generate a reflection ray and if the refraction rate does not correspond to 0, the ray generation unit 120 may generate a refraction ray. Also, the ray generation unit 120 may generate a shadow ray for light source. The shading unit 150 transmits the shading information into the setup processing unit 110. The shading information of the ray-triangle hit point includes a coordinate value, a color value and a shading ray type.

In one embodiment, the phong illumination may adopt architecture in [HARRIS, D. 2004, An exponentiation unit for an opengl lighting engine. IEEE Transactions on Computers]. In one embodiment, the texture mapping may support bilinear filtering scheme and selects cache architecture in [HAKURA, Z. S., AND GUPTA, A. 1997. The design and analysis of a cache architecture for texture mapping. SIGARCH Computer Architecture News].

Figure 10:
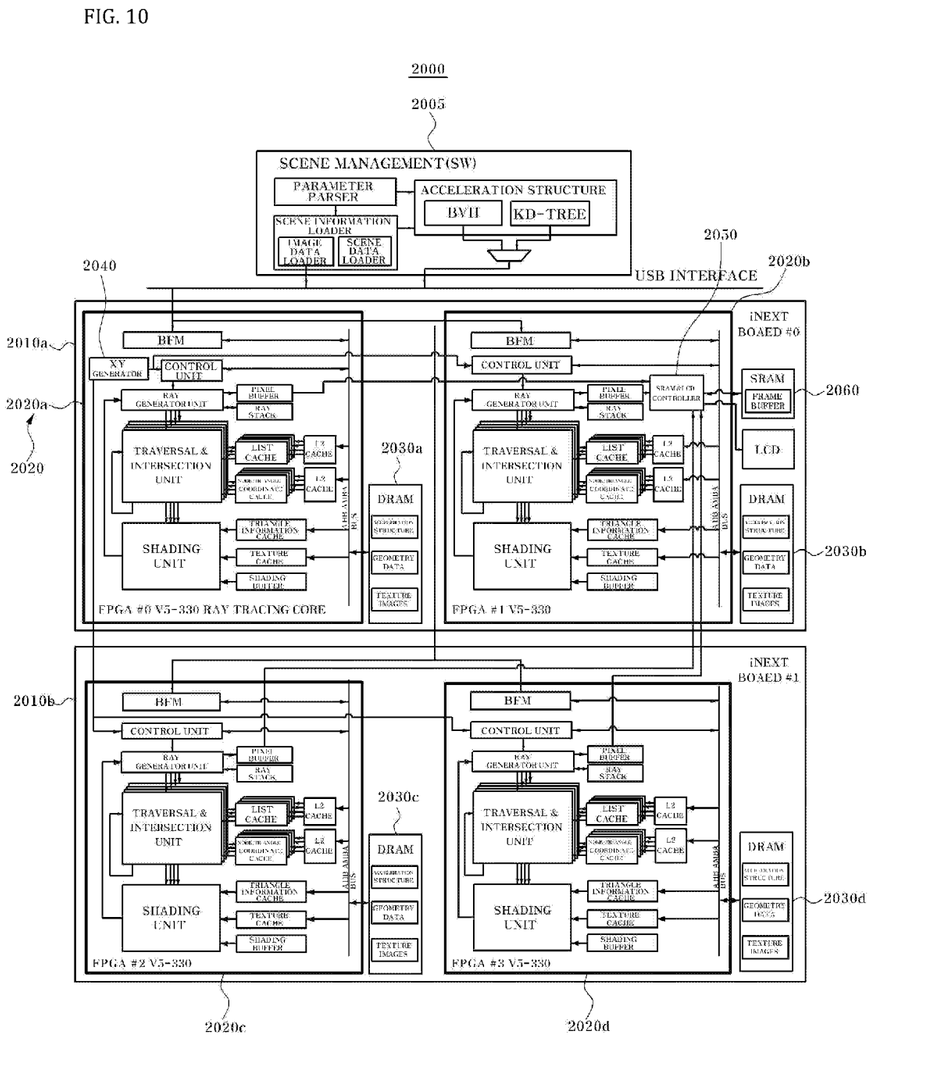
FIG. 10 is a diagram illustrating a ray tracing board included in a ray tracing core in FIG. 1.

FIG. 10 is a diagram illustrating a ray tracing board included in a ray tracing core in FIG. 1.

Referring to FIG. 10, the ray tracing board 2000 includes a first and second ray tracing sub-boards 2010a and 2010b. The first ray tracing sub-board 2010a includes ray tracing chips 2020a and 2020b and the second ray tracing sub-board 2010b includes ray tracing chips 2020c and 2020d.

Because the ray tracing core 2020 is substantially equal to the ray tracing core in FIG. 1, a difference between them will be described.

A CPU (central processing unit) in a host computer executes a scene management software 2005 and the scene management software 2005 builds the AS and the AS, the geometry data and texture data through a USB interface and BFM (Bus Functional Model) to a memory (DRAM) 2030a through 2030d in each of the ray tracing chip 2020. Then, the ray tracing core 2020 starts execution.

The first ray tracing chip 2010a operates as a master. An XY generator in the first ray tracing chips 2010a transmits a block address (i.e., at least one block of image) to an adequate ray tracing core (e.g., idle ray tracing chip) 2020. The ray tracing core 2020 selected by the XY generator 2040 receives the block address and then performs rendering for a predetermined pixel block. For example, the predetermined pixel block may correspond to 16×16 pixel block. After a rendering completion, the ray tracing core 2020 may require a next block address to the XY generator 2040. The final color value in each of the ray tracing core 2020 is stored in SRAM 2060 through SRAM & LCD controller 2050.

The described technology has the following advantages. However, since it does not mean that a specific embodiment should have all the advantages or should have only the advantages, it should not be understood that the range of the rights of the disclosed technology are limited by the advantages.

A ray tracing core according to an example embodiment may support MIMD (Multiple Instruction stream Multiple Data stream) architecture for effectively performing a ray tracing.

A ray tracing core according to an example embodiment adopts unified pipeline architecture adequate to an acceleration structure to effectively perform a ray-box intersection, a traversal and a ray-triangle intersection test used in a ray tracing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ray tracing core comprising:
  a ray generation unit configured to generate an eye ray based on eye ray generation information and to generate a shading ray according to a shading ray type based on shading information, the shading information having a priority over the eye ray generation information and the eye ray generation information including a screen coordinate value;
  a plurality of T&I (Traversal & Intersection) units with MIMD (Multiple Instruction stream Multiple Data stream) architecture, each of the plurality of T&I units configured to independently and concurrently process a ray with a corresponding ray type and to check whether there exists a triangle intersected with the received at least one eye ray, the triangle configuring a space in an AS (Acceleration Structure),
  wherein for a ray-triangle hit point in the intersected triangle, the shading information is generated for a secondary ray according to material information in the intersected triangle or for a shadow ray for light source, and
  wherein each of the plurality of T&I units includes an L1 cache and the ray tracing core includes a common L2 cache for the L1 caches in the plurality of T&I units, and when an L1 cache miss occurs in a current ray, a requirement for an L2 cache access is inputted to L1 Addr (Address) FIFO (First in First Out) and when the L2 cache access is hit, an address and data is inputted to an L1 Addr/Data (Address and Data) FIFO and otherwise, other requirement for an external memory is inputted to an L2 Addr FIFO.

2. The ray tracing core of claim 1, further comprising:
  a shading unit configured to calculate a color value about the ray-triangle hit point in the intersected triangle, the ray-triangle hit point being hit by the at least one eye ray, when there exists the triangle intersected with the at least one received eye ray.

3. The ray tracing core of claim 2, wherein the shading unit generates shading information including a coordinate value of the ray-triangle hit point, the calculated color value and shading ray type, and wherein the shading information can further include additional information according to the shading ray type.

4. The ray tracing core of claim 3, wherein the ray generation unit generates shading ray or stores a final color value based on the generated shading information.

5. The ray tracing core of claim 4, further comprising:
  a secondary ray stack configured to store at least one secondary ray, wherein when a number of the at least one secondary ray is equal to or greater than 2, the ray generation unit allocates one of the at least one secondary ray to one of the plurality of T&I units and pushes other secondary ray into the secondary ray stack.

6. The ray tracing core of claim 5, wherein when the shading ray type corresponds to null ray, the ray generation unit pops the pushed secondary ray from the secondary ray stack, and allocates the popped secondary ray into one of the plurality of T&I units.

7. The ray tracing core of claim 1, wherein each of the plurality of T&I units includes a T&I pipeline unit configured to perform a traversal procedure, a triangle list fetch procedure and ray-triangle intersection test procedure based on the eye ray.

8. The ray tracing core of claim 7, wherein each of the plurality of the T&I units further includes an input buffer and an output buffer for the MIMD architecture.

9. The ray tracing core of claim 1, further comprising:
  a setup processing unit configured to divide a screen into a plurality of blocks for increasing hit ratio of each of the plurality of the T&I units and determine eye ray generation order based on each of the plurality of the blocks.

10. The ray tracing core of claim 9, wherein the setup processing unit divides the screen into a plurality of m×n (m and n are even) pixel blocks (hereinafter, referred to as super-blocks), divides each of the super-blocks into n (n is the number of the plurality of the blocks) pixel blocks (hereinafter, referred to as sub-blocks) and determines eye ray generation order based on each of the sub-blocks and wherein each of the sub-blocks has the same size.

11. The ray tracing core of claim 10, wherein the setup processing unit includes a linear n-bit counter for determining the eye ray generation order, wherein a first group of the linear n-bit counter represents an x coordinate value of the sub-blocks and a second group of the linear n-bit counter represents a y coordinate value of the sub-blocks and wherein the first group may include at least one non-continuous bit and the second group may include at least one other non-continuous bit.

12. The ray tracing core of claim 1, wherein when the L1 cache miss occurs in a current cycle, the L1 cache miss bypasses without stall so that the L1 cache miss is solved in a next cycle.

13. A ray tracing core, comprising:
  a setup processing unit configured to multiplex one of eye ray generation information or shading information, the shading information having a priority over the eye ray generation information, the eye ray generation information including a screen coordinate value and the shading information including a coordinate value, a color value and shading ray type for a ray-triangle hit point;
  a ray generation unit configured to generate an eye ray based on eye ray generation information and to generate a shading ray according to a shading ray type based on shading information; and
  a plurality of T&I (Traversal & Intersection) units with MIMD (Multiple Instruction stream Multiple Data stream) architecture, each of the plurality of T&I units configured to independently and concurrently process a ray with a corresponding ray type and to check whether there exists a triangle intersected with the received at least one eye ray, the triangle configuring a space in an AS (Acceleration Structure),
  wherein for a ray-triangle hit point in the intersected triangle, the shading information is generated for a secondary ray according to material information in the intersected triangle or for a shadow ray for light source, and wherein each of the plurality of T&I units includes an L1 cache and the ray tracing core includes a common L2 cache for the L1 caches in the plurality of T&I units, and when an L1 cache miss occurs in a current ray, a requirement for an L2 cache access is inputted to L1 Addr (Address) FIFO (First in First Out) and when the L2 cache access is hit, an address and data is inputted to an L1 Addr/Data (Address and Data) FIFO and otherwise, other requirement for an external memory is inputted to an L2 Addr FIFO.

14. The ray tracing core of claim 13, further comprising:
a hit point calculation unit configured to calculate the ray-triangle hit point at the intersected triangle based on the generated at least one eye ray or shading ray.

15. The ray tracing core of claim 14, further comprising:
a shading unit configured to calculate a color value of the calculated ray-triangle hit point and transmit shading information for the calculated ray-triangle hit point.

16. The ray tracing core of claim 13, wherein each of the plurality of T&I units includes a T&I pipeline unit configured to perform a traversal procedure, a triangle list fetch procedure and ray-triangle intersection test procedure based on the generated at least one eye ray or shading ray.

17. A ray tracing chip, comprising:
a plurality of ray tracing cores;
an XY generator configured to allocate at least one block of image to a ray tracing core of the plurality of ray tracing cores; and
a memory configured to store a final color value outputted from each of the plurality of ray tracing cores,
wherein each of the plurality of ray tracing cores comprises:
a ray generation unit configured to generate an eye ray based on eye ray generation information and to generate a shading ray according to a shading ray type based on shading information, the shading information having a priority over the eye ray generation information and the eye ray generation information including a screen coordinate value;
a plurality of T&I (Traversal & Intersection) units with MIMD (Multiple Instruction stream Multiple Data stream) architecture, each of the plurality of T&I units configured to independently and concurrently process a ray with a corresponding ray type and to check whether there exists a triangle intersected with the received at least one eye ray, the triangle configuring a space in an AS (Acceleration Structure),
wherein for a ray-triangle hit point in the intersected triangle, the shading information is generated for a secondary ray according to material information in the intersected triangle or for a shadow ray for light source, and wherein each of the plurality of T&I units includes an L1 cache and each ray tracing core includes a common L2 cache for the L1 caches in the plurality of T&I units, and when an L1 cache miss occurs in a current ray, a requirement for an L2 cache access is inputted to L1 Addr (Address) FIFO (First in First Out) and when the L2 cache access is hit, an address and data is inputted to an L1 Addr/Data (Address and Data) FIFO and otherwise, other requirement for an external memory is inputted to an L2 Addr FIFO.

18. A ray tracing chip, comprising:
a plurality of ray tracing cores;
an XY generator configured to allocate at least one block of image to an adequate ray tracing core of the plurality of ray tracing cores; and
a memory configured to store a final color value outputted from each of the plurality of ray tracing cores,
wherein each of the plurality of ray tracing cores comprises:
a setup processing unit configured to multiplex one of eye ray generation information or shading information, the shading information having a priority over the eye ray generation information, the eye ray generation information including a screen coordinate value and the shading information including a coordinate value, a color value and shading ray type for a ray-triangle hit point;
a ray generation unit configured to generate an eye ray based on eye ray generation information and to generate a shading ray according to a shading ray type based on shading information; and
a plurality of T&I (Traversal & Intersection) units with MIMD (Multiple Instruction stream Multiple Data stream) architecture, each of the plurality of T&I units configured to independently and concurrently process a ray with a corresponding ray type and to check whether there exists a triangle intersected with the received at least one eye ray, the triangle configuring a space in an AS (Acceleration Structure),
wherein for a ray-triangle hit point in the intersected triangle, the shading information is generated for a secondary ray according to material information in the intersected triangle or for a shadow ray for light source, and
wherein each of the plurality of T&I units includes an L1 cache and each ray tracing core includes a common L2 cache for the L1 caches in the plurality of T&I units, and when an L1 cache miss occurs in a current ray, a requirement for an L2 cache access is inputted to L1 Addr (Address) FIFO (First in First Out) and when the L2 cache access is hit, an address and data is inputted to an L1 Addr/Data (Address and Data) FIFO and otherwise, other requirement for an external memory is inputted to an L2 Addr FIFO.

* * * * *